United States Patent [19]
Judkins et al.

[11] Patent Number: 4,560,126
[45] Date of Patent: Dec. 24, 1985

[54] CONDUIT SUPPORT BRACKET AND METHOD FOR SUPPORTING AN ELONGATED MEMBER

[75] Inventors: Milton W. Judkins, Bellaire; Arthur C. Williams, Spring, both of Tex.

[73] Assignee: Electrical Hardware, Inc., Garland, Tex.

[21] Appl. No.: 615,089

[22] Filed: May 29, 1984

Related U.S. Application Data

[63] Continuation of Ser. No. 352,709, Feb. 26, 1982, abandoned.

[51] Int. Cl.[4] .............................................. F16L 3/24
[52] U.S. Cl. ........................................ 248/72; 248/73
[58] Field of Search ............... 248/72, 73, 220.2, 83, 248/84, 88, 49, 300, 74.1; 52/689, 714; 24/339, 336

[56] References Cited

U.S. PATENT DOCUMENTS

| | | | |
|---|---|---|---|
| 991,736 | 5/1911 | Minnick | 248/49 |
| 1,140,455 | 5/1915 | Finger | 248/83 |
| 2,040,750 | 5/1936 | Long | 248/300 |
| 2,060,390 | 11/1936 | Adams | 248/88 |
| 2,472,654 | 6/1949 | Engelke | 248/49 |
| 2,814,840 | 12/1957 | Seaks | 52/714 |
| 3,241,798 | 3/1966 | Nestor | 248/88 |
| 4,168,423 | 9/1979 | Gilreath | 24/336 |

OTHER PUBLICATIONS

Caddy Fasteners, Erico Products, Inc., pp. 43–45.
Suspension Fasteners, Thomas Industries, Inc., pp. 14 and 29.

*Primary Examiner*—Ramon S. Britts
*Assistant Examiner*—Ramon O. Ramirez
*Attorney, Agent, or Firm*—Arnold, White & Durkee

[57] ABSTRACT

A conduit support bracket useful in supporting conduit, cable, piping or the like, especially above a dropped ceiling is disclosed. The conduit support bracket comprises a strip of rigid material having engaging means extending from one end to securely engage a T-bar, fixture or other support structure. This engaging means is preferably provided by a plurality of prongs bent and rebent in oppositely inclined directions. The conduit support bracket further comprises a plurality of deformable tabs extending from the opposite end of the rigid strip. At least one of these deformable tabs is shaped to form a channel between itself and the remaining tabs. This channel is of sufficient size and strength to support the conduit or the like. The remaining deformable tabs are of sufficient length to securely hold the conduit in place when deformed, preferably manually, at least partially around the conduit.

8 Claims, 4 Drawing Figures

CONDUIT SUPPORT BRACKET AND METHOD FOR SUPPORTING AN ELONGATED MEMBER

This is a continuation of application Ser. No. 06,352,709, filed Feb. 26, 1982, now abandoned.

BACKGROUND OF THE INVENTION

1. Field of the Invention

This invention relates generally to a device for use in supporting a conduit, cable, piping or the like, especially above a dropped ceiling. More particularly, a device, both simple to manufacture and easy to use, constructed of a rigid strip of material having means for attaching to support structure at one end and deformable tabs at the opposite end to hold a conduit or the like is disclosed.

2. Description of the Background

Many buildings, both old and new, employ dropped ceiling construction. Dropped ceiling construction is particularly heavily used in commercial and industrial buildings. Dropped ceiling construction requires reliable installation of electrical and other utility services above the ceiling. These installations should be vibration resistant. The National Electrical Code requires that all AC cable be secured by approved staples, straps, hangers or similar fittings so designed and installed as not to injure the cable at intervals not exceeding four and a half feet and within twelve inches from every outlet box or fitting (N.E.C. §333-7).

Commonly, electrical and other utility services are strung above the dropped ceiling through the supporting girders just below the next higher floor. When so installed, conduit or the like may simply be passed through, resting upon these girders, and may or may not be tied thereto. In such an installation, several feet (as much as four to six feet) of conduit must be dropped to each light fixture or junction box. These installations may result in the use of ten percent or more conduit than is required for proper installation when the conduit is installed just above the dropped ceiling.

When installed just above the dropped ceiling, the most commonly used bracket or fasteners is illustrated by those manufactured by Thomas Industries, Inc. and Erico Products, Inc. These brackets or fasteners comprise an elongated strap portion having a spring steel clip at one end for clipping over a T-bar and a spring steel snap end conduit/pipe clip at the other end. These brackets, although easy to use, are manufactured of relatively high cost spring steel and require fastening during manufacturing, such as by rivets, of the spring steel clips and snap end brackets to the strap portion. The disadvantages associated with manufacture of such brackets are clear. The art has long sought a simple, easily manufactured, easily used, yet reliable conduit support bracket.

SUMMARY OF THE INVENTION

The conduit support bracket of the present invention overcomes the foregoing disadvantages and provides an easily manufactured, easily used, yet reliable bracket suitable for supporting conduit, cable, piping or the like, especially above a dropped ceiling. Hereinafter, "conduit" shall be used to mean conduit, cable, piping or the like. The present invention provides a support bracket which may easily and conveniently be manufactured from a single strip of deformable material.

The support bracket of the present invention comprises in its simplest embodiment a strip of rigid material having an engaging means at one end for engaging the bracket to a support structure, such as a T-bar or light fixture. This means is provided in one embodiment by a hole therethrough for fastening with a screw, rivet or the like. In another embodiment of the present invention this means is provided by a plurality of at least partially resilient engaging prongs extending angularly from the end of the bracket. At least one of these prongs is inclined oppositely from the others, so that these prongs provide frictional engagement when placed over the upright portion of a T-bar support. In a further refinement of this embodiment, at least one pair of adjacent prongs is spaced apart sufficiently to permit placement of the bracket over a T-bar at a T-bar intersection.

The conduit support bracket is further characterized by a plurality of deformable tabs extending from the opposite end of the rigid strip. These tabs are capable of being easily deformed to hold and support a conduit, piping, bar or the like. In the preferred embodiment, at least one of these deformable tabs is shaped to form a channel between this shaped tab and the remaining tabs. This channel is of sufficient size and strength to receive and support the conduit. The remaining tabs are deformable and of sufficient length to securely hold the conduit when deformed at least partially around the conduit.

The conduit support bracket of the present invention has many advantages. It is easily manufactured and used. It is easily installed without tools. It reliably and securely supports conduit above the T-bar acoustical grid in close relation to the light fixtures and junction boxes, while meeting National Electric Code standards. It is removable, adjustable and reusable. These and other meritorious features and advantages of the present invention will be more fully appreciated from the following detailed description and claims.

While the invention will be described in connection with the preferred embodiment, it will be understood that it is not intended to limit the invention to that embodiment. On the contrary, it is intended to cover all alternatives, modifications and equivalents as may be included within the spirit of the invention as defined in the appended claims.

DETAILED DESCRIPTION OF THE PREFERRED EMBODIMENT

The conduit support bracket 10 of the present invention is useful for supporting conduit, cable, piping or the like, particularly above a dropped ceiling over acoustical ceiling T-bar supports, fixtures or the like. In the preferred embodiment, illustrated in FIGS. 1 and 2, conduit support bracket 10 is manufactured from a single strip of rigid sheet material, preferably galvanized steel, with the end portions thereof formed during manufacture to the desired shapes.

Figure 1:
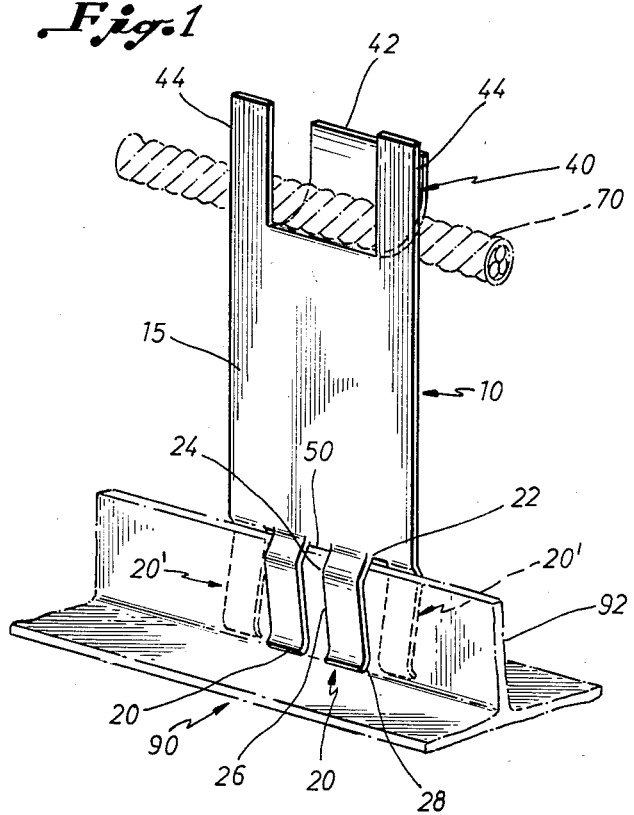
FIG. 1 is a perspective drawing of the preferred embodiment of the conduit support bracket in its intended environment of use, illustrating the bracket positioned over a T-bar and a conduit lying in the channel prior to deformation of the securing tabs.

Conduit support bracket 10 comprises in the preferred embodiment a strip 15 of deformable, rigid sheet material of any desired length to support conduit 70 at the required height above T-bar 90, fixture 80 or the like. Strip 15 may be manufactured in any desirable shape from any rigid material, although galvanized sheet steel is preferred for simplicity, ease of manufacture and cost. Support bracket 10 is most preferably manufactured from 16 to 20 gauge galvanized steel sheet. In the presently contemplated most preferred embodiment, the overall height of conduit support bracket 10 may vary from about four inches to about ten inches, while having a width of about two inches to about three inches. In this most preferred embodiment, bracket 10 may be of a single width, as illustrated in FIG. 1, a strip 15 and tabs 40 may be narrower than the combined widths of prongs 20 and 20' and space 50. When strip 15 is manufactured from a conducting material, it may offer the further advantage of forming part of a static ground system.

Figure 3:
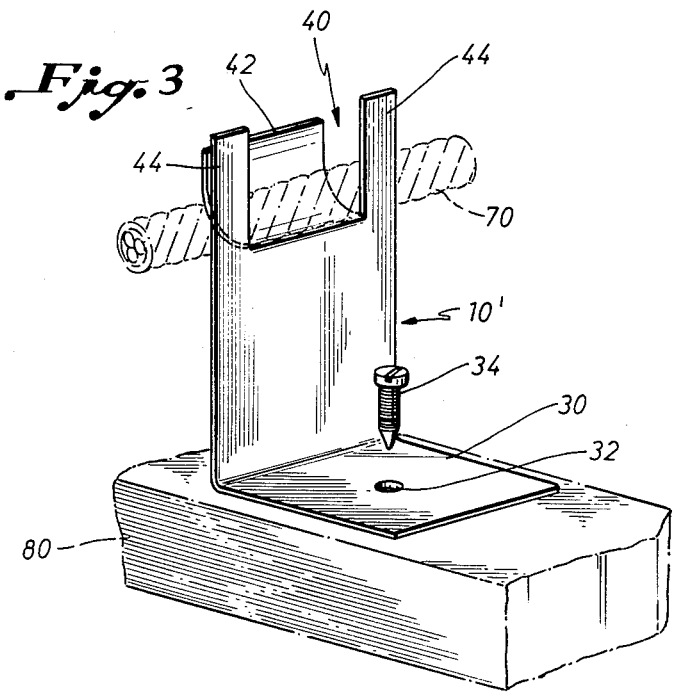
FIG. 3 is a perspective drawing of an alternative embodiment of the conduit support bracket, illustrating a bracket secured to a fixture by a sheet metal screw.
Figure 4:
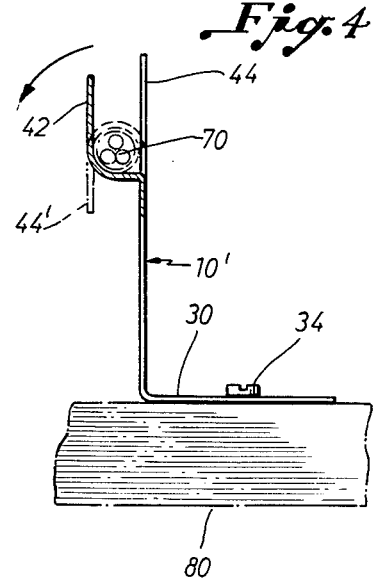
FIG. 4 is an end view of the bracket of FIG. 3 illustrating the securing tabs both prior to and after deformation to secure the conduit.

Conduit support bracket 10 is further characterized by an engaging means at one end thereof for engaging support bracket 10 to support structure of a building, such as T-bar 90 or fixture 80. FIGS. 3 and 4 illustrate one means of engaging conduit support bracket 10 with fixture 80. In this embodiment, the end portion of support bracket 10 is bent at any desirable angle, preferably 90° as illustrated, to provide engaging surface 30. Although a 90° bend is preferred, any angle from 0° to about 180° is easily provided to engage support bracket 10 with any angle surface on fixture 80 or to position bracket 10 so as to avoid contact with other overhead conduits or the like. Engagement is provided by any available fastening means, such as screw 34, through hole 32 which is smooth or threaded.

Figure 2:
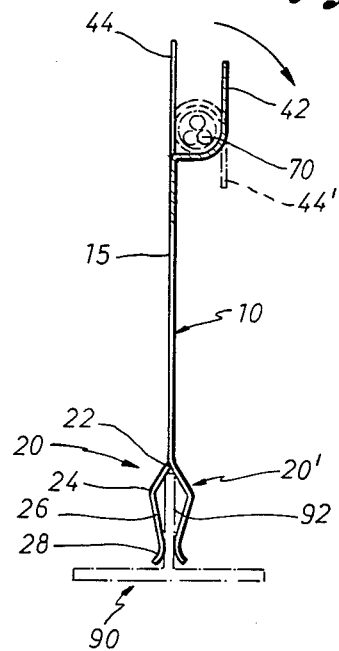
FIG. 2 is a an end view of the conduit support bracket of FIG. 1, illustrating the securing tabs in their predeformed position and after deformation to securely hold the conduit.

In the preferred embodiment of conduit support bracket 10 engaging means is provided by a plurality of at least partially resilient engaging prongs 20 and 20' extending angularly from one end of strip 15, as illustrated in FIGS. 1 and 2. Prongs 20 are bent and rebent at 22 and 24 to provide bent end portions 26 to engage and grip the upright portion 92 of a flange member such as T-bar 90. Prongs 20 are further rebent in 28 in a more preferred embodiment to facilitate engagement of prongs 20 when placed over upright portion 92 of flange member 90. At least one prong 20' of prongs 20, its bends 22' and 24', its bent end portion 26' and rebent tip 28' are inclined oppositely from the others.

Oppositely inclined prongs 20 and 20', when placed on opposite sides of portion 92 of flange 90 securely engage conduit support bracket 10 in place. Prongs 20 and 20', although sufficiently deformable to allow the above bends to be made during manufacturing, are at least partially resilient to frictionally engage bracket 10 to flange 92. In the most preferred embodiment it is contemplated that two prongs 20 and two prongs 20', all about five-eighth inches wide and about one and one-half inches long provide the engaging means. In the presently contemplated most preferred embodiment, the above described engaging means is integrally manufactured, along with strip 15, from 16 to 20 gauge galvenized steel sheet, further providing a static ground. The engaging means need not be integral with strip 15, but only manufactured of material suitable for engaging support structure.

The engaging means of the preferred embodiment is simple to manufacture and easy to use. It may easily be engaged or disengaged by hand, requiring no additional tools. Its position may be adjusted by sliding bracket 10 along flange member 90. Support bracket 10, having this engaging means, is easily and readily reusable.

In an alternative embodiment of the present invention at least one pair of adjacent engaging prongs 20 is spaced apart sufficiently at 50 to permit a cross-flange (not shown) to pass therebetween. In a more preferred alternative embodiment a pair of oppositely engaging prongs 20 and 20' is spaced apart sufficiently at 50 from a second pair of prongs 20 and 20' to permit the cross-flange (not shown) to pass therebetween. These alternative embodiments permit positioning of conduit support bracket 10 easily and securely over the intersection of two T-bars. In the presently preferred alternative embodiment it is contemplated that space 50 be about three-eighth inches wide and of the same lenth as prongs 20 and 20'.

Another feature of the present invention is a plurality of deformable tabs 40 extending from the opposite end of strip 15 of conduit support bracket 10. Deformable tabs 40 are capable of being easily deformed to hold and support conduit 70 between oppositely deformed tabs 42 and 44. In the presently preferred embodiment, at least one tab 42 of the deformable tabs 40 is shaped to form a channel between shaped tab 42 and the remaining tabs 44. This channel is of sufficient size and strength to receive and support conduit 70. The remaining tabs 44 are deformable and of sufficient length to securely hold conduit 70 in the channel when deformed at least partially around (as shown at 44') conduit 70. Tabs 44 are manufactured of any suitable material which is easily deformable, especially manually. Tabs 44, when manually deformable into securing position 44' by hand or by using a hand-held tool provide a secure, reliable installation which is also easily removed and reused.

In the preferred embodiment tabs 40, like prongs 20 and 20', are integral with strip 15 to form conduit support bracket 10. In the most preferred embodiment tabs 40, like strip 15 and prongs 20 are manufactured from a single strip of 16–20 gauge rigid sheet metal material, preferably galvenized steel. In the presently contemplated preferred embodiment deformable tabs 44 are about threeeighth inches wide, while shaped tab 42 is about threefourth inches wide. Tabs 42 and 44 vary in length and must be sufficiently long to support and secure the desired diameter of conduit. With conduit diameters ranging from three-eighth inch to two inches, it is presently believed that tabs 42 and 44 of length one and three-fourth inches to three inches are sufficient.

In a further feature of the present invention, strip 15, deformable tabs 40 and engaging prongs 20 are manufactured from a conducting material to provide a static ground for conduit 70.

The foregoing description of the invention has been directed in primary part to a particular preferred embodiment in accordance with the requirements of the patent statutes and for purposes of explanation and illustration. It will be apparent, however, to those skilled in the art that many modifications and changes in this specific apparatus may be made without departing from the scope and spirit of the invention. For example, the number and size of engaging prongs 20 and deformable tabs 40 may vary. Therefore, the invention is not restricted to the particular form of construction illustrated and described, but covers all modifications which may fall within the scope of the following claims.

It is applicant's intention in the following claims to cover such modfications and variations as fall within the true spirit and scope of the invention.

What is claimed is:

1. A plurality of support brackets suitable for use in combination with each other for supporting an elongated member along a desired path above a dropped ceiling, each bracket comprising:

a central strip of deformable, semi-rigid sheet material;

means extending from one end of said strip for gripping a flange to attach the bracket above a dropped ceiling; and a cradle at the opposite end of said central strip of material for receiving and positioning a section of an elongated member along an axis essentially parallel to the central strip of material, the cradle being formed to extend outwardly away from the central strip of material sufficiently to receive the elongated member and then in general parallel relationship to the central strip; and at least one retaining tab adjacent said cradle, said tab being smaller in width than said cradle and being adapted to be manually bent around said elongated member, so that the plurality of brackets support the elongated member along a desired path.

2. The bracket as defined in claim 1, wherein the plurality of resilient engaging prongs includes four prongs, one pair of said prongs being on one side of the center line of the central strip of deformable material, and another pair of said prongs being on the other side of said center line, a slot being along said center line between said pairs of prongs to permit a cross flange to pass therebetween.

3. The bracket as defined in claim 1, wherein said semi-rigid strip of deformable material, said cradle, said prongs, and said retaining tab are comprised of a conducting material suitable for providing a static ground.

4. The bracket as defined in claim 2, wherein said semi-rigid strip of deformable material, said cradle, said prongs, and said retaining tab are comprised of a conducting material suitable for providing a static ground.

5. The bracket as defined in claim 1, wherein the means for gripping a flange comprises a plurality of at least partially resilient engaging prongs.

6. The bracket as defined in claim 1, further characterized by including a pair of tabs, one on each side of said cradle.

7. A method of supporting an elongated member above a dropped ceiling, comprising the steps of:

positioning a support bracket, which includes a central strip of sheet material, on a ceiling support structure by engaging that structure with at least partially resilient engaging means on the support bracket at one end of the central strip;

placing a relatively lightweight conduit, cable, piping or the like in a cradle on the bracket, the cradle being at the opposite end of the central strip from the engaging means and being formed to extend outwardly away from the central strip sufficiently to received a relatively lightweight conduit, cable, piping or the like and then in general parallel relationship to the central strip; and manually bending a pair of retaining tabs at least partially around the conduit, cable, piping or the like, one tab being on each side of the cradle at the same end of the central strip of material.

8. A method of supporting an elongated member above a dropped ceiling, comprising the steps of:

positioning a support bracket, which includes a central strip of sheet material, on a ceiling support structure by engaging that structure with at least partially resilient engaging means on the support bracket at one end of the central strip;

placing a relatively lightweight conduit, cable, piping or the like in a cradle on the bracket, the cradle being at the opposite end of the central strip from the engaging means and being formed to extend ourwardly away from the central strip sufficiently to receive a relatively lightweight conduit, cable, piping or the like and then in general parallel relationship to the central strip; and manually bending at least one retaining tab adjacent said cradle at least partially around the conduit, cable, piping or the like.

* * * * *